Oct. 14, 1958  R. C. RISNER  2,856,088
AUTOMOBILE CARRIERS
Filed July 5, 1956  3 Sheets-Sheet 1
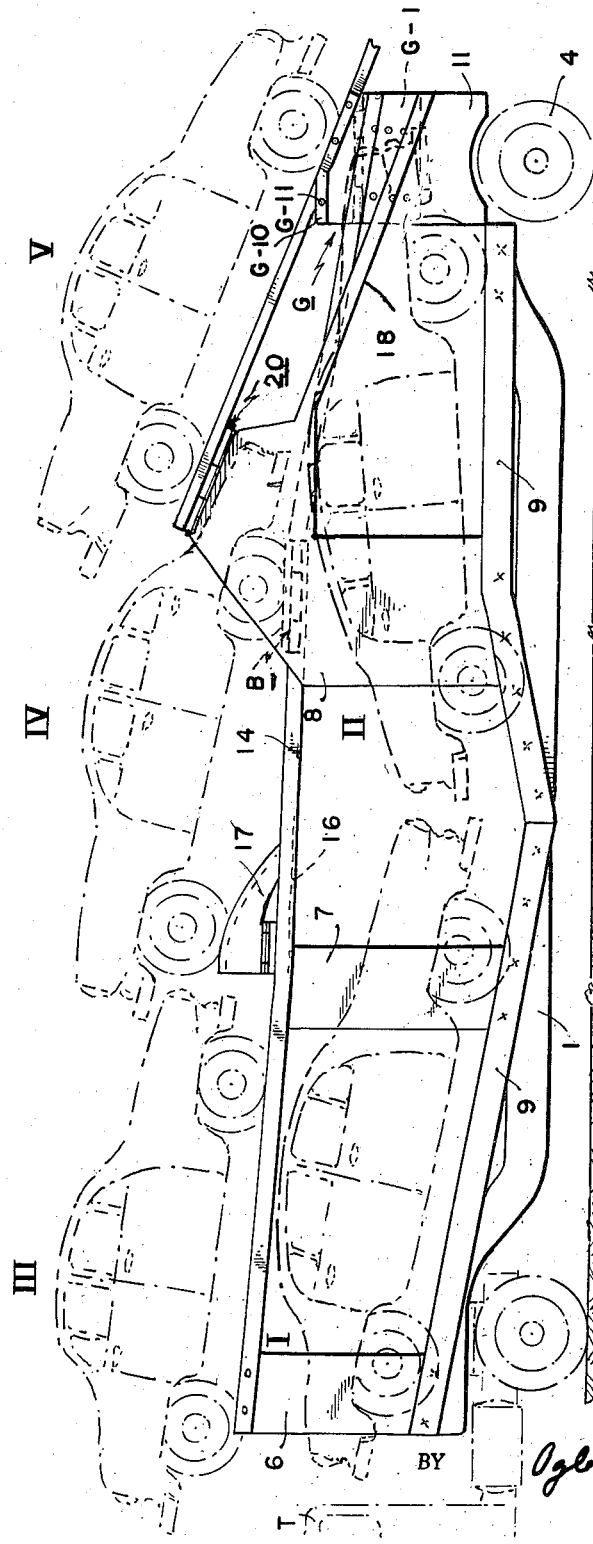
INVENTOR
ROBERT C. RISNER
BY Ogle R. Singleton
ATTORNEY Oct. 14, 1958         R. C. RISNER         2,856,088
AUTOMOBILE CARRIERS
Filed July 5, 1956         3 Sheets-Sheet 2
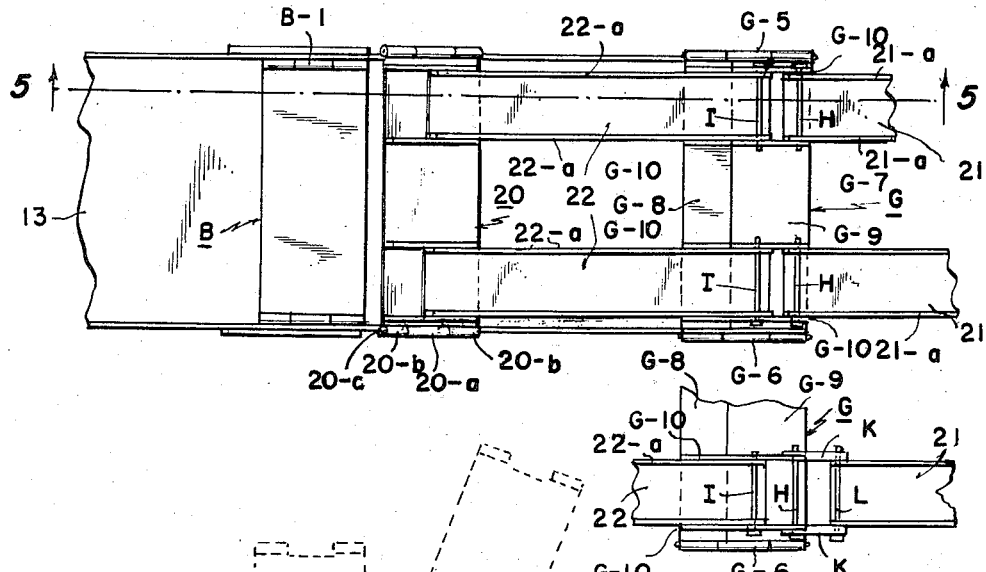
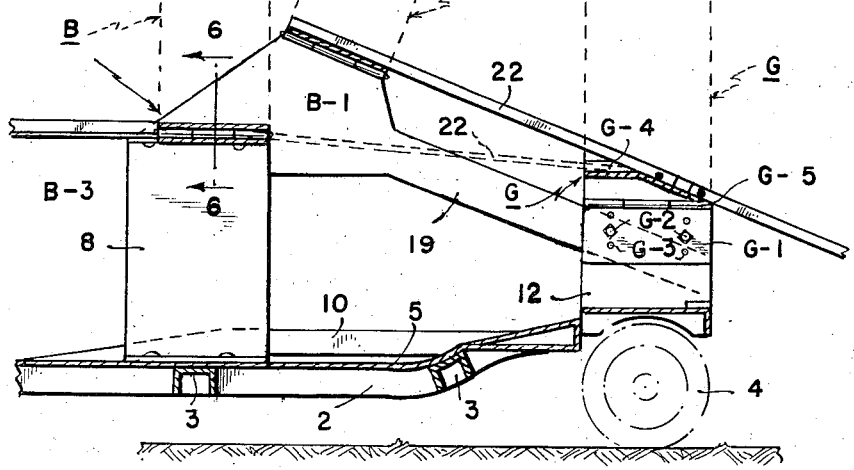
INVENTOR
ROBERT C. RISNER
BY *Ogle P. Singleton*
ATTORNEY Oct. 14, 1958 — R. C. RISNER — 2,856,088
AUTOMOBILE CARRIERS
Filed July 5, 1956 — 3 Sheets-Sheet 3
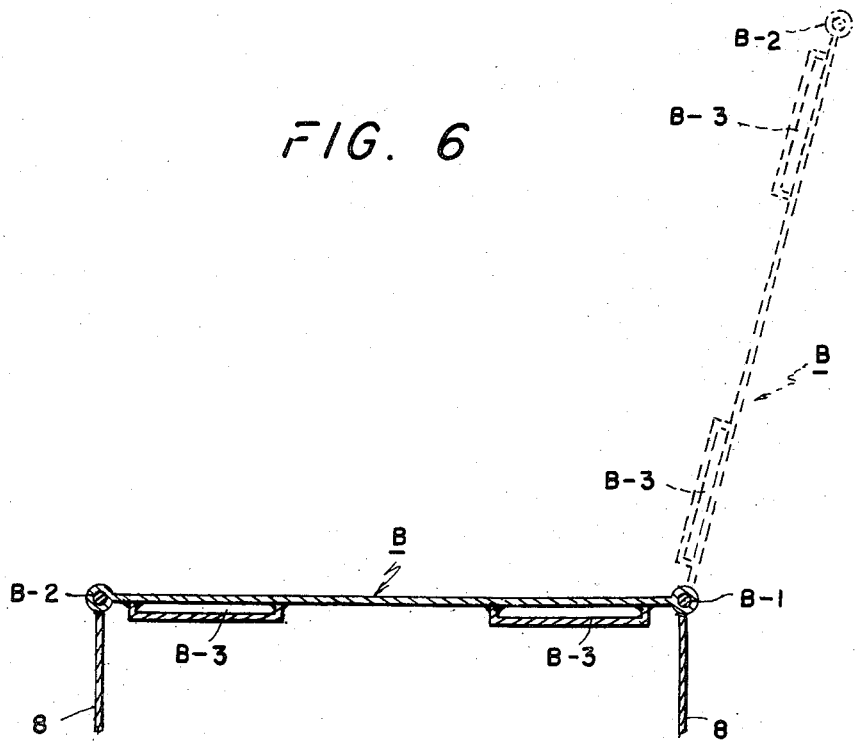
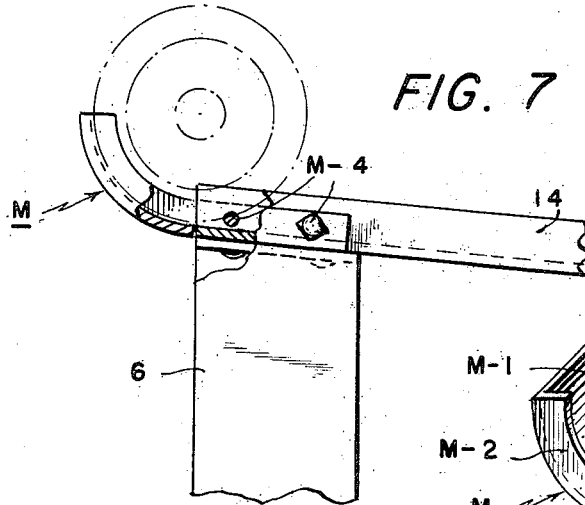
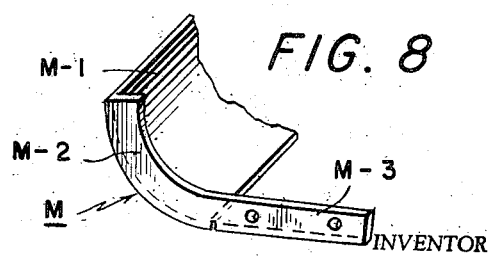
INVENTOR
ROBERT C. RISNER
BY Ogle B. Singleton
ATTORNEY

United States Patent Office 2,856,088
Patented Oct. 14, 1958

2,856,088

AUTOMOBILE CARRIERS

Robert C. Risner, Towson, Md.

Application July 5, 1956, Serial No. 596,006

6 Claims. (Cl. 214—85)

My invention consists in a new and useful improvement in automobile carriers and constitutes a considerable improvement over the carrier disclosed and claimed in my co-pending application Serial Number 444,064, now Patent No. 2,766,898. The particularly useful feature of my invention is the provision of considerably increased carrying capacity of the trailer. Moreover, this increase is afforded without increasing the dimensions of the trailer. While the carriers now in use having a limited carrying capacity can carry only four automobiles, my improved trailer of my said application Serial Number 444,064 has the carrying capacity of five automobiles, which is secured by the disclosed structure and combination of the elements of my trailer, whereby a lower, an intermediate and an upper trackway are provided. Due to the present designs of automobiles of greater length, the available storage space in the trailer must be increased. This increase has been achieved by the features disclosed herein, over that of the trailer of application Serial Number 444,064, now Patent No. 2,766,898. The features, whereby this result has been attained, are an improved rear gate, a second bridge, adjustable ramps and removable attachments for the ends of the trailer. By embodying these novel features in my trailer, I have provided adequate space wherein two large-size automobiles and three standard-size automobiles can be loaded.

It is to be particularly understood that this result has been produced in a trailer having only the maximum length and height permitted by the laws of the several States.

While I illustrate in the drawings and hereinafter fully describe one specific embodiment of my invention, it is to be distinctly understood that I do not consider my invention to be limited to said embodiment but refer for its scope to the claims appended hereto.

In the drawings:

Fig. 1 is a side elevation of my improved trailer fully loaded with five cars, viz. two large-size cars and three standard-size cars, the tractor for the trailer and the loaded cars being shown in broken lines.

Fig. 2 is a fragmentary, side elevation to illustrate means for modified loading of the fifth car.

Fig. 3 is a fragmentary top plan of the trailer showing two sets of skids positioned for loading the fifth car as shown in Fig. 1.

Fig. 4 is a fragmentary top plan of two skids (one of each of the two sets) to illustrate the means for loading the fifth car as shown in Fig. 2.

Fig. 5 is a longitudinal, vertical section on the line 5—5 of Fig. 3.

Fig. 6 is a transverse, vertical section on the line 6—6 of Fig. 5.

Fig. 7 is a fragmentary, side elevation of one of the attachments to serve as stops at the forward end of the intermediate trackway of the trailer, parts being broken away.

Fig. 8 is a perspective of the attachment of Fig. 7.

Fig. 9 is a side elevation, partly in section, of one of the adjustable, hinged ramps on the intermediate trackway.

As shown in the drawings, my improved trailer has a base comprising longitudinal, side beams 1 and 2 (Figs. 1 and 5) and transverse beams 3, of ordinary U-shaped channel irons, supported at its rear end by ground wheels 4 and at its forward end by the usual coupling with the tractor T. It will be noted (Figs. 1 and 5) that the beams 1 and 2 are so configured that the trailer is underslung between the coupling and wheels 4. Suitably mounted on the beams 1, 2 and 3 there is a lower trackway 5. Suitably mounted on the beams 1 and 2 there are two sets of pillars 6, 7 and 8 on the sides of the trackway 5, respectively. Longitudinal, strengthening ribs 9 and 10 are provided for the pillars. Suitably mounted on the base above the wheels 4 are the side walls 11 and 12. Suitably mounted on the pillars 6, 7 and 8 there is an intermediate trackway 13 having upstanding, lateral flanges 14 and 15, and a hatch 16 (Fig. 1). A pair of arcuate ramps 17 are so hingedly mounted on the trackway 13, on the sides of the hatch 16, respectively, as to be adapted to be disposed alternatively on the trackway 13 and in the hatch 16. Each ramp 17 (Fig. 9) is mounted by a hinge 17-a on a base 17-b which is adjustably mounted for movement axially of the trackway 13 by bolts 17-c passed through suitable holes in the trackway 13.

Struts 18 and 19 connect the pillars 8 with the walls 11 and 12. Suitably hinged on the upper end of the strut 19 there is a swingable bridge 20 (Fig. 5) having on its free end a keeper 20-a co-acting with a pair of keepers 20-b on the upper end of the strut 18 for locking pin 20-c for holding the bridge 20 in closed position.

The above-described details of construction are substantially identical with the details disclosed in my co-pending application Serial Number 444,064.

I will now describe the details of construction which comprise the novel features of my improved trailer disclosed in this application.

I have provided a novel form of gate G mounted on the side walls 11 and 12 (Figs. 1, 2, 3, 4 and 5). The gate G has a pair of vertical side walls G-1 which are vertically adjustable on walls 11 and 12, being fixed in adjusted positions by bolts G-2 (Fig. 5) in selected registering bolt holes G-3. A second pair of side walls G-4 are mounted on the upper ends of the walls G-1 by a hinge G-5 on one side wall G-1 and suitable keepers G-6 on the other side wall G-1. The side walls G-4 are connected at the upper edges by a top wall G-7 (Fig. 3) which comprises a forward, horizontal portion G-8 and a rear, sloping portion G-9.

It will be noted (Fig. 5) that the bridge 20 is so mounted that its surface slopes downwardly and rearwardly so that the surfaces of the bridge and the rear portion G-9 lie in a common plane.

It will be noted (Figs. 3 and 5) that in the trailer of this application the rear end of the fixed, intermediate trackway 13 is spaced forwardly of the bridge 20 and that I have provided a bridge B in the space provided thereby. The bridge B (Fig. 6) is mounted on the upper end of one of the pillars 8 by means of a hinge B-1 and suitable keepers B-2 on the opposite pillar 8. The bridge B has on its under side a pair of brackets B-3 for supporting the forward end of a pair of skids as will presently be explained.

For my improved trailer, I provide two sets of improved skids 21 and 22. There is a pair of skids 21 designed to form a trackway from the ground to the several trackways in the trailer. There is a pair of skids 22 designed to be used alternatively to form a trackway from the gate G to the bridge B and a trackway from the gate G to the bridge 20. The skids 21 have upstanding lateral flanges 21–a and the skids 22 have upstanding lateral flanges 22–a. It is to be noted (Fig. 3) that the forward ends of the flanges 22–a are spaced rearwardly from the forward ends of the skids 22 to allow insertion of the skids 22 between the bridge B and its brackets B–3.

The bridge 20 has two pairs of upstanding flanges 20–d. The gate G has two pairs of upstanding flanges G–10 extending across portions G–8 and G–9 of top wall G–7.

The skids 21 are mounted on the gate G by pins H passed through registering holes in flanges 21–a and G–10. The skids 22 are mounted on the gate G by pins I passed through registering holes in flanges 22–a and G–10 when the skids 22 have their rear ends resting on the portion G–9 of the top wall G–7 of the gate G and their forward ends resting on the bridge 20, the flanges 20–d receiving the skids 22 therebetween. The skids 22 are mounted on gate G by pins I passed through flanges 22–a and suitably disposed registering holes G–11 in the portions of the flanges G–10 on the portion G–8 when the skids 22 have their rear ends resting on the portion G–8 and their forward ends received in the brackets B–3. The skids 21 are mounted on the lower trackway 5 by suitable pins passed through registering holes in the flanges 21–a and flanges 5–a mounted at the rear end of the trackway 5.

For loading the fifth car as illustrated in Figs. 2 and 4, I provide removable brackets K mounted on flanges G–10 by pins H and on which the skids 21 are mounted by pins L.

To provide removable stops at the forward end of the intermediate trackway 13, I provide a pair of attachments M for each wheel of the automobile to be loaded at said forward end (Figs. 7 and 8). Each attachment comprises an arcuate plate M–1 so designed as to be substantially concentric with a wheel stopped thereby, and having a pair of arcuate, lateral flanges M–2 from which extend shanks M–3 adapted to be removably attached to the forward ends of the flanges 14 and 15 and a pair of intermediate flanges (not shown) of the trackway 13, by bolts M–4.

Having described the details of construction of my improved trailer, I will now describe their use and operation.

It will be understood that cars I and II are placed on the lower trackway 5; that cars III and IV are placed on the intermediate trackway 13; and that car V is placed on the upper trackway formed by the bridge 20 connected by skids 22 with the gate G (Figs. 1 and 5). It will be noted (Fig. 1) that only car IV is headed forwardly, the other four cars being headed rearwardly in the trailer.

To load cars I and II, the bridges 20 and B and the gate G are opened and skids 21 are connected with the trackway 5. Cars I and II are backed up skids 21 and into position on trackway 5. It is to be noted (Fig. 1) that by providing the removable bridge B and the vertically adjustable gate G, which are novel features over the trailer of application Serial Number 444,064, it is possible to load on trackway 5 cars I and II which are much larger than those loaded on the lower trackway of my earlier trailer. This is because, by using gate B, the fixed rear end of the intermediate trackway 13 is considerably further forward than in my earlier trailer, which allows a much larger car I to pass forwardly on trackway 5 and under trackway 13. Also, by providing the vertically adjustable gate G having a relatively thin top wall G–7, the forward end of car II can be positioned, under the top wall G–7, much nearer the rear end of the trailer than in my earlier trailer.

As clearly shown in Fig. 1, my present trailer is designed to receive on trackway 5 cars I and II of very considerably greater length than in my earlier trailer.

To load cars III and IV, the bridge B and the gate G are closed and skids 22 are mounted to connect bridge B and gate G (dotted lines in Fig. 5), their ends being held in place by pins I passed through flanges 22–a of skids 22 and holes G–11 in flanges G–10 of the gate G, and their front ends being received in brackets B–3 of bridge B. Skids 21 are mounted on gate G, their forward ends being held in place by pins H passed through flanges 21–a of skids 21 and flanges G–10 of gate G, to form a trackway from the ground to gate G. Attachments M are bolted on the forward end of the trackway 13, and ramps 17 are swung downwardly into hatch 16. Car III is backed up skids 21 and 22 and into its position at the forward end of the trackway 13, its rear wheels against attachments M. Ramps 17 are then swung upwardly to position on trackway 13 and car IV is driven forwardly up skids 21 and 22 into its position, its front wheels resting on ramps 17.

It will be noted (Fig. 1) that when car IV is loaded, in its assigned position, the rear end of car IV is spaced considerably forwardly of the rear end of the trailer. It is obvious therefore that if it be desired to load the trailer with three automobiles and a truck or a "bus," this can be done by removing bridge 20 and leaving skids 22 as placed for loading car IV.

It is obvious that when car III has been fixed in position by the usual holding chains, the attachments M can be removed and stowed in any suitable manner in the trailer to be used if desired in the unloading operation. The peculiar advantage in the use of my improved attachments is that they serve as stops for car III when it is being loaded, allowing the rear wheels of the car to be positioned at the extreme forward end of trackway 13, and, being removable, they do not extend the over-all length of the trailer, while on the road, beyond its legal limit.

To load car V, bridge 20 is lowered and locked in closed position, skids 22 are placed to connect bridge 20 and gate G, and car V is backed up skids 21 and 22 into its position (Fig. 1). The skids 21 are then removed and stowed in any suitable place in the trailer for subsequent use in unloading, and the loaded trailer is ready to roll.

For loading car V as shown in Figs. 2 and 4, the removable brackets K are used, serving a purpose, at the rear end, as attachments M, at the forward end. Use of brackets K allows the front wheels of car V to be positioned at the extreme rear end of the trailer, and being removable they do not extend the over-all length of the trailer, while on the road, beyond its legal limit.

It is to be understood that when each of the cars is placed in its proper position in the trailer, it is fastened therein by the conventional chain locking means.

It will be noted that when cars I and II are loaded they are so disposed relative pillars 7 and 8 that free access to their front doors is afforded, which is a very valuable feature facilitating loading and unloading.

It is obvious that the cars are unloaded from the trailer by reversing the above-described method of loading.

It is to be particularly noted that, as above described, cars I, II, III and V are backed onto the trailer in loading, and car IV is driven forwardly in loading. However, it must be understood that the structure of my trailer is such that car IV can be backed onto the trailer in loading. Hence, while cars I, II and III must be backed on to be properly loaded, car IV can be loaded either way, and car V is better loaded by backing on.

Having described my invention, what I claim is:

1. In an automobile carrier, the combination of a fixed lower trackway for two automobiles; a fixed intermediate trackway above said lower trackway; a removable intermediate trackway above said lower trackway and adapted to co-act with said fixed intermedite trackway for two additional automobiles; a second removable trackway; a third removable trackway adapted to alternatively co-act with said first removable trackway to afford passage of said two additional automobiles to said intermediate trackways, and to co-act with said second removable trackway to form an upper trackway for a fifth automobile; and a pair of skids adapted to alternatively extend from the ground to said lower trackway and to said third removable trackway.

2. A carrier, according to claim 1, in which said first removable trackway is a bridge.

3. A carrier, according to claim 1, in which said second removable trackway is a bridge.

4. A carrier, according to claim 1, in which said third removable trackway comprises a gate removably mounted above said lower trackway and a second pair of skids adapted to alternatively connect said gate with said first removable trackway, and said gate with said second removable trackway.

5. A carrier, according to claim 4, in which said gate is vertically adjustable.

6. A carrier, according to claim 1, having a pair of ramps hingedly mounted on said fixed intermediate trackway for adjustment axially of said trackway.

References Cited in the file of this patent

UNITED STATES PATENTS

| | | |
|---|---|---|
| 1,558,581 | Bloom | Oct. 27, 1925 |
| 1,809,557 | Lishon | June 9, 1931 |
| 2,038,141 | Stone | Apr. 21, 1936 |
| 2,559,712 | Dobbs | July 10, 1951 |
| 2,583,734 | Francis | Jan. 29, 1952 |
| 2,670,694 | Smith | Mar. 2, 1954 |

FOREIGN PATENTS

| | | |
|---|---|---|
| 866,913 | Germany | Feb. 12, 1953 |